United States Patent [19]
Sham et al.

[11] Patent Number: 5,943,949
[45] Date of Patent: Aug. 31, 1999

[54] INDOOR GRILLE

[75] Inventors: John C. K. Sham, Hong Kong, The Hong Kong Special Administrative Region of the People's Republic of China; Kumkit KunavongVorakul, Bangkok, Thailand

[73] Assignee: Wing Shing Products (BVI) Co., Ltd., Aberdeen, The Hong Kong Special Administrative Region of the People's Republic of China

[21] Appl. No.: 09/070,183

[22] Filed: Apr. 30, 1998

[51] Int. Cl.⁶ ........................................ A47J 37/00
[52] U.S. Cl. .................. 99/450; 99/422; 99/447; 219/401; 126/369.1; 392/324
[58] Field of Search .............................. 99/410, 422, 447, 99/450; 219/401; 126/369.1; 392/333, 324

[56] References Cited

U.S. PATENT DOCUMENTS

| | | | |
|---|---|---|---|
| 4,013,869 | 3/1977 | Orts | 219/401 |
| 4,509,412 | 4/1985 | Whittenburg et al. | 219/401 X |
| 5,176,067 | 1/1993 | Higgins | 99/447 X |
| 5,445,066 | 8/1995 | Rosset | 99/447 X |
| 5,868,063 | 2/1999 | Longmuir | 219/401 X |

*Primary Examiner*—Milton Cano
*Attorney, Agent, or Firm*—Salzman & Levy

[57] ABSTRACT

An indoor grille having a steam-generating reservoir is described. The reservoir is heated by the heating elements used to heat the grille structure of the unit. The combination of steaming and grilling provides a flavorful quality to meats and other foods prepared therein. The heating elements of the grille are disposed in the metal body of the unit, which acts like a heat sink. The heat sink ensures that the unit attains cooking temperatures faster.

15 Claims, 2 Drawing Sheets

INDOOR GRILLE

FIELD OF THE INVENTION

The present invention relates to a grille apparatus and, more particularly, to an indoor, steam grille that can impart flavors and spicy aromas to grilled foods.

BACKGROUND OF THE INVENTION

Many people like the taste of grilled foods, but not every one has the luxury of having an outdoor barbecue. The present invention provides a small grille apparatus for indoor use, which can uniquely impart flavors and aromas to meats, fish, or poultry being grilled. The grille makes efficient use of its energy, by reason that it is die cast from aluminum. The aluminum body acts as a heat sink, thus providing a rapid rise to heating temperatures. The grille is also light of weight due to the aluminum body. The heating elements, or coils, are buried in the aluminum body, thus providing efficient conductive heat transfer to the unit.

A water reservoir is located in the middle of the base of the grille. The water in the reservoir is heated along with the grille, so that steam is emitted from the reservoir during the cooking cycle. The steam issuing from perforations in the reservoir of the grille surrounds the food as it is being cooked, thus improving the cooking process. Spices and flavorings can be added to the water as the reservoir starts to heat, thus imparting the spicy aromas and flavors to the food.

A section of the grille is slightly sloped, causing juices, oils, and fats to drain into the reservoir which, as aforementioned, is located in the base of the grille. The draining oils and fats allow the unit to cook cleaner (i.e., with less smoke).

The die cast aluminum body is surrounded by a jacket of phenolic, which provides good insulation. The runners of the grille are coated with a non-stick coating comprising polytetrafluoroethylene (PTFE) or equivalent.

An adjustable thermal control allows the unit to be set to different cooking temperatures in order to correctly prepare the various foods.

SUMMARY OF THE INVENTION

In accordance with the present invention, there is provided an indoor grille apparatus. The grille body is shaped like a serving dish, and is made of lightweight, heat conductive material, such as die cast aluminum. The heating elements or coils are disposed within the body of the grille, thus providing efficient heat transfer by reason that the aluminum body acts as a heat sink. The heat sink insures a rapid rise to heating temperatures. The grille is also light in weight. A water reservoir is located in the middle of the base of the grille. The water in the reservoir is heated along with the grille, so that steam is emitted from the reservoir during the cooking cycle. The steam issuing from perforations in the shell of the reservoir tank surrounds the food as it is being cooked, thus improving the cooking process. Spices and flavorings can be added to the water as the reservoir starts to heat, thus imparting spicy aromas and flavors to the food. A section of the grille is slightly sloped, causing juices, oils, and fats to drain into the reservoir which, as aforementioned, is located in the base of the grille. The draining oils and fats allow the unit to cook cleaner (i.e., with less smoke). The die cast aluminum body is surrounded by a jacket of phenolic, which provides good insulation. The elements of the grille are coated with a non-stick coating comprising polytetrafluoroethylene (PTFE) or equivalent.

It is an object of this invention to provide an improved indoor grille.

It is another object of the invention to provide a grille apparatus that combines steam with the grilling to enhance the flavor of the food.

It is a further object of this invention to provide an indoor grille that is heat efficient.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components will bear the same designation and numbering throughout the figures.

DESCRIPTION OF THE PREFERRED EMBODIMENT

Generally speaking, the invention features an indoor grille having a steam-generating reservoir. The reservoir is heated by the heating elements used to heat the grille structure of the unit. The combination of steaming and grilling provides a flavorful quality to meats and other foods prepared therein. The heating elements of the grille are disposed in the metal body of the unit, which acts like a heat sink. The heat sink ensures that the unit attains cooking temperatures faster.

Figure 1:
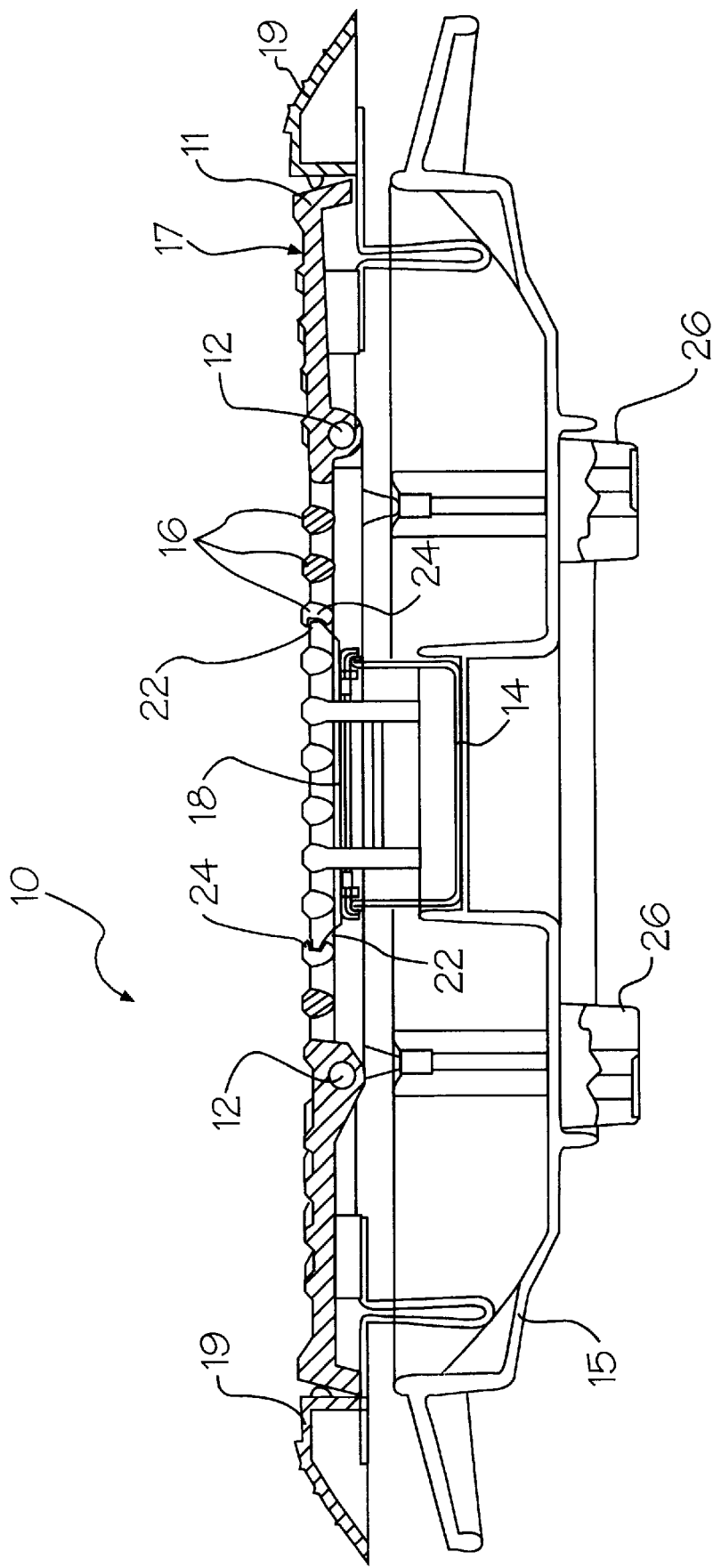
FIG. 1 illustrates a sectional side view of the indoor grille of this invention.
Figure 2:
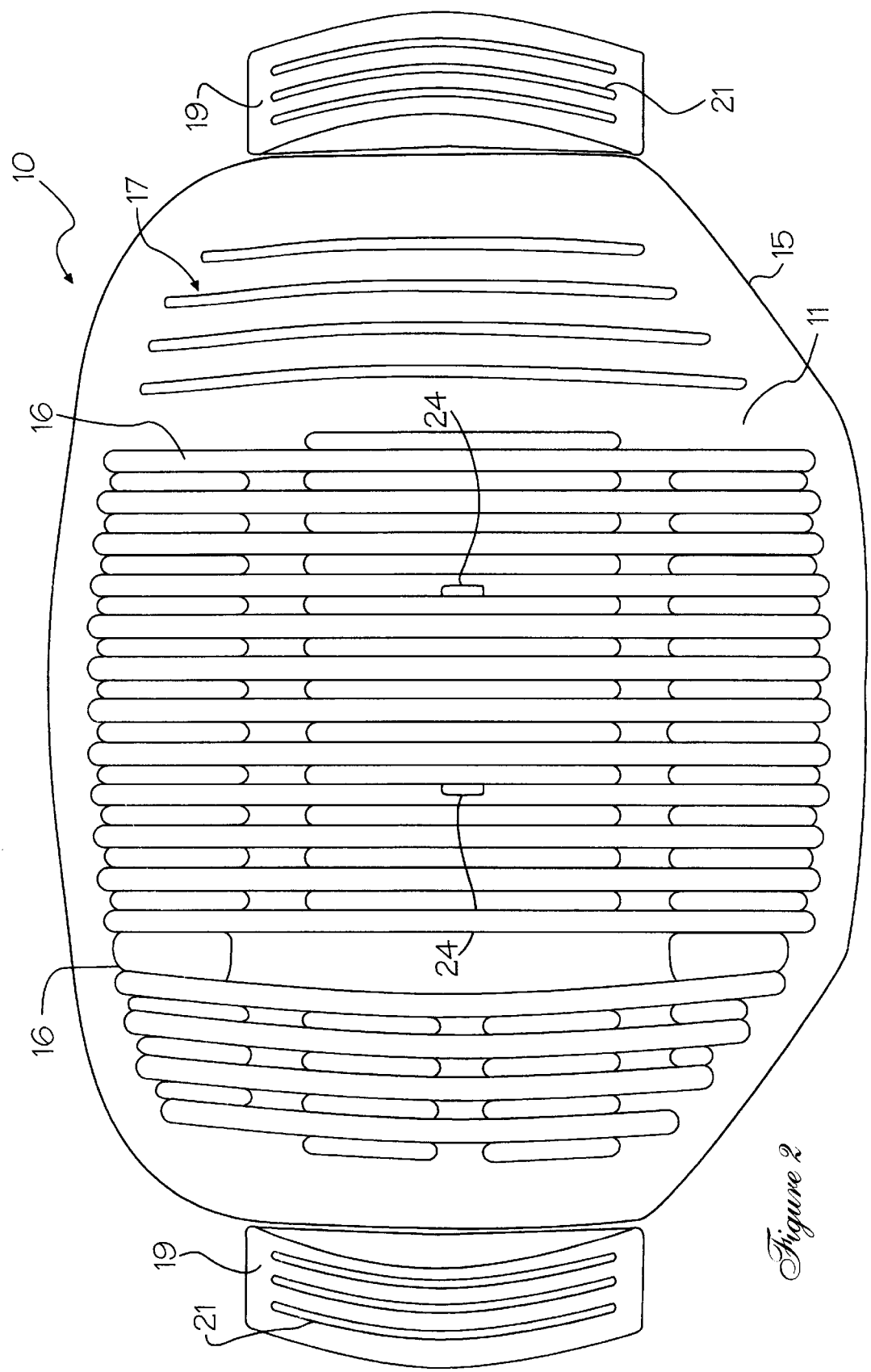
FIG. 2 depicts a plan view of the indoor grille shown in FIG. 1.

Now referring to FIGS. 1 and 2, the indoor grille unit 10 of this invention is illustrated. The indoor grille unit 10 comprises a metal or thermally conductive body 11, which is preferably fabricated from die cast aluminum. The metal body 11 acts as a heat sink for the heating elements 12 that are buried in the body 11. The heat sink ensures a rapid rise to heating temperatures. The grille 10 is also light in weight.

A water reservoir tank 14 is located in the middle of the base 15 of the grille unit 10. The water in the reservoir is heated along with the grille cross elements 16, so that steam, not shown, is emitted from the reservoir during the cooking cycle. The steam issuing from perforations, not shown, in the tank cover 18 surrounds the food as it is being cooked, thus improving the cooking process. Spices, herbs, seasonings, and flavorings can be added to the water or liquid as the reservoir starts to heat, thus imparting spicy aromas and flavors to the food. The cover 18 is spring-loaded with respect to the grille body 11. The spring plates 22 snap into the grooves 24 provided in middle elements 16.

The righthand section 17 is slightly sloped, causing juices, oils, and fats to drain into the reservoir tank 14 which, as aforementioned, is located in the base 15. The draining oils and fats allow the unit 10 to cook cleaner (i.e., with less smoke).

The base 15 comprises high-temperature resistant plastic. The preferred plastic is phenolic. The base 15 comprises four legs 26 that distance the grille unit 10 from a kitchen table.

The elements 16 of the grille 10 are coated with a non-stick coating comprising a teflonized material, such as polytetrafluoroethylene PTFE. Polytetrafluoroethylene (PTFE) is preferred because it also provides abrasion resistance.

The grille unit 10 has plastic handles 19 on its distal ends, which allow the body 11 of the grille 10 to be lifted out of the base 15. The handles 19 have ridges 21 for facilitating gripping, as illustrated in FIG. 2.

An adjustable thermal control, not shown, allows the unit 10 to be set to different cooking temperatures in order to correctly prepare various foods.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An indoor grille unit, comprising:
   a body portion comprising a thermally conductive material, acting as a heat sink, said body portion having a plurality of grille elements on an upper surface thereof;
   heating elements buried in the body portion for providing heat to said grille elements;
   an insulative base supporting said body portion; and
   a water reservoir located in a mid-portion of said base, the water in the reservoir being heatable along with the grille elements, so that steam is emitted from the reservoir during a cooking cycle.

2. The indoor grille unit in accordance with claim 1, wherein said water reservoir comprises a tank having a tank body with a perforated lid.

3. The indoor grille unit in accordance with claim 2, wherein said perforated lid is spring-loaded with respect to said grille body.

4. The indoor grille unit in accordance with claim 1, wherein said grille body has a section that slopes with respect to said insulative base causing juices, oils, and fats to drain into the water reservoir during a cooking cycle.

5. The indoor grille unit in accordance with claim 1, wherein said insulative base comprises a high-temperature resistant plastic.

6. The indoor grille unit in accordance with claim 5, wherein said insulative base comprises a phenolic.

7. The indoor grille unit in accordance with claim 1, wherein said grille elements are coated with a substantially non-stick material.

8. The indoor grille unit in accordance with claim 7, wherein said substantially non-stick material comprises polytetrafluoroethylene.

9. An indoor grille unit, comprising:
   an insulative base supporting a body portion;
   a body portion comprising a thermally conductive material, acting as a heat sink, said body portion having a plurality of grille elements on an upper surface thereof, said grille body further including a section that slopes with respect to a base causing juices, oils, and fats to drain into the water reservoir during a cooking cycle;
   heating elements buried in the body portion for providing heat to said grille elements; and
   a water reservoir located in a mid-portion of said base, the water in the reservoir being heatable along with the grille elements, so that steam is emitted from the reservoir during a cooking cycle.

10. The indoor grille unit in accordance with claim 9, wherein said water reservoir comprises a tank having a tank body with a perforated lid.

11. The indoor grille unit in accordance with claim 10, wherein said perforated lid is spring-loaded with respect to said grille body.

12. The indoor grille unit in accordance with claim 9, wherein said insulative base comprises a high-temperature resistant plastic.

13. The indoor grille unit in accordance with claim 12, wherein said insulative base comprises a phenolic.

14. The indoor grille unit in accordance with claim 9, wherein said grille elements are coated with a substantially non-stick material.

15. The indoor grille unit in accordance with claim 14, wherein said substantially non-stick material comprises polytetrafluoroethylene.

\* \* \* \* \*